United States Patent
Mentink et al.

(10) Patent No.: US 6,648,964 B2
(45) Date of Patent: Nov. 18, 2003

(54) ADMIXTURES FOR MINERAL BINDERS BASED ON HYDROGENATED DISACCHARIDE, ADMIXTURE-CONTAINING MINERAL BINDERS, AND A PROCESS FOR THE PREPARATION THEREOF

(75) Inventors: Leon Mentink, Lille (FR); Jean-Pierre Graux, Lillers (FR); Clement Robert, Sailly sur la Lys (FR)

(73) Assignee: Roquette Freres, Lestrem (FR)

( * ) Notice: Subject to any disclaimer, the term of this patent is extended or adjusted under 35 U.S.C. 154(b) by 301 days.

(21) Appl. No.: 09/848,133

(22) Filed: May 3, 2001

(65) Prior Publication Data

US 2001/0029872 A1 Oct. 18, 2001

Related U.S. Application Data

(62) Division of application No. 09/247,424, filed on Feb. 10, 1999.

(51) Int. Cl.⁷ .............................................. C04B 24/38
(52) U.S. Cl. ..................... 106/729; 106/730; 106/804; 106/823
(58) Field of Search ................. 106/729, 730, 106/804, 823

(56) References Cited

U.S. PATENT DOCUMENTS

| | | | |
|---|---|---|---|
| 4,073,658 A | 2/1978 | Ohtani et al. | |
| 5,626,666 A | 5/1997 | Briat et al. | 106/728 |
| 5,880,182 A * | 3/1999 | Minomiya et al. | 524/5 |

FOREIGN PATENT DOCUMENTS

| | | |
|---|---|---|
| EP | 0.650.941 A1 | 5/1995 |
| FR | 2.387.194 | 11/1978 |
| GB | 1.508.761 | 4/1978 |
| GB | 2.293.821 | 4/1996 |
| GB | 2.309.693 | 8/1997 |
| JP | 01257112 * | 10/1989 |
| JP | 10259065 * | 9/1998 |
| SU | 933945 * | 6/1982 |

OTHER PUBLICATIONS

"Hydration of 4 Cao–$Al_2O_3$–$SO_3$ Cement Paste in the Presence of Ca Hydroxide, Ca Sulfate Dihydrate & Some Organic Cpds" Callepohi et al. Gidratatsiya i Tverderik Tsementov (1976), 2, Pt 2 32–7.*
Patent abstracts of Japan, vol. 097, No. 006, (Jun. 30, 1997) & JP 09 040447 (Kao Corp).
Data base WPI AN 80–68553C XP002080473 & JP 55 104957, Aug. 11, 1980 (Kao Soap Co Ltd).

* cited by examiner

Primary Examiner—Paul Marcantoni
(74) Attorney, Agent, or Firm—Sturm & Fix LLP

(57) ABSTRACT

A novel admixture for mineral binders is composed of a polyol composition with a high hydrogenated disaccharide content ($\geq 40\%$). The hydrogenated disaccharide is advantageously chosen from maltitol, lactitol and mixtures thereof. Within the admixture, the polyol composition (for example, maltitol powder, a maltitol syrup or a hydrogenated starch hydrolysate) may be combined with conventional admixtures for mineral binders, particularly lignosulfonates. The hydrogenated disaccharides make it possible to obtain an excellent compromise between retardation, plasticity and the mechanical properties of the mineral binder. They may be used equally well for admixing with cements and raw materials for cements as for admixing with mortars, slurries and concretes.

23 Claims, No Drawings

ADMIXTURES FOR MINERAL BINDERS BASED ON HYDROGENATED DISACCHARIDE, ADMIXTURE-CONTAINING MINERAL BINDERS, AND A PROCESS FOR THE PREPARATION THEREOF

CROSS-REFERENCE TO RELATED APPLICATIONS

This application is a Divisional of U.S. patent application Ser. No. 09/247,424, filed Feb. 10, 1999, the disclosure of which is being incorporated herein by reference in its entirety.

FIELD OF THE INVENTION

The present invention relates to admixtures for mineral binders based on hydrogenated disaccharide(s). It also relates to admixture-containing mineral binders and to a process for the preparation thereof.

BACKGROUND OF THE INVENTION

The term "mineral binder" means primarily any hydraulic binder and more particularly any composition, notably any mineral powder, capable of forming with water a paste which sets and hardens gradually, even away from the air. Conventionally, at ambient temperature, a hydraulic binder starts to form such a paste with water within a period of about a few minutes to less than 48 hours, generally between about 30 minutes and 24 hours.

This definition applies to the following, this list being in no way restrictive:

cements, and particularly those belonging to the group comprising cements of the artificial Portland type, cements of the blended Portland type, blastfurnace slag cements, Portland blastfurnace cement 85, Portland pulverized fuel ash cements, and ground cements for more particular uses of the type including slag cement containing lime, masonry cement, natural cement, supersulfated cement, rapid-hardening cement, quick-setting and rapid-hardening cement, cement for work in water with low or high sulfate contents, natural or artificial hydraulic limes, mixtures such as mortars, slurries, coatings and concretes based on cement and/or lime, water and/or aggregates of all particle sizes (sands, gravels, crushed stones . . . ) and particularly those belonging to the group comprising ready-mixed dry industrial mortars, site-mixed mortars, pre-batched dry industrial mortars, ready-mixed mortars, grouting compounds, injection mortars, slurries and injection slurries, reinforced and unreinforced concretes, ready-mixed concretes, flowing concretes, heavy concretes, lightweight concretes, lightweight insulating concretes, cellular concretes, fiber concretes, prestressed concretes and fair-faced concretes.

This definition also includes the raw materials used in the production of cements such as pozzolanas, clinkers, slags, calcareous fillers and silica fume.

The term "mineral binder" also means non-hydraulic binders, particularly materials based on calcium sulfate, gypsum and/or lime.

Mineral binders are materials which are very widely used, particularly in the building industry, for producing the various parts of structures such as the framework, floor, shell and roof, and also in public works, particularly for the production of bridges, tunnels, dams, roads and other works such as, for example, offshore structures or nuclear power stations.

Depending on the final use of these materials and also depending on the conditions under which they will be used, it is sometimes necessary to add admixtures to the mineral binders. Said admixtures modify, by improving them, the properties of the mineral binders to which they are added in small proportions, generally at most equal to 5% by weight of the mineral binder. Examples of admixtures include grinding agents or grinding auxiliaries, plasticizers, water-reducing plasticizers, superplasticizers, set and hardening accelerators, retarders, air entraining agents, waterproofing compounds and curing agents. These admixtures make it possible, for example, to modify the workability, setting, hardening, strength, durability and/or certain other properties of the hydraulic binder.

Numerous water-reducing plasticizer products or superplasticizers are already in use. Examples include:

molasses derived from sugar beet and sugar cane, which are relatively inexpensive products capable of fermenting and with limited effectiveness;

raw lignosulfonates derived from the paper industry which are relatively inexpensive but have the disadvantage of causing foaming of the mortars or concretes, thus reducing their strength at 28 days;

sugars derived from starch which are good water-reducing plasticizers but strong retarders;

oxidized sugars such as gluconates and oxidized starch hydrolysates which are very good water-reducing plasticizers, retarders and which also make it possible to improve the strength at 28 days as described in French patent FR 2 387 194 and in GB 1 508 761;

sulfonated condensates of naphthalene formaldehyde and sulfonated condensates of melamine formaldehyde which are very good plasticizers, weak retarders but which do not improve the strength at 28 days and are rather unacceptable environmentally;

polyacrylates which are superplasticizers, weak retarders but which bring about little or no improvement in the strength at 28 days;

polyols such as hydrogenated sugars such as sorbitol and hydrogenated starch hydrolysates which, as described in patent FR 2 726 550, are water-reducing plasticizers but which have a markedly weaker retarding effect than oxidized sugars whilst improving the strength at 28 days, as follows from American patent U.S. Pat. No. 4,073,658; hydrogenated sugar syrups are also described as grinding agents, such as oxidized glucose syrups, according to patent EP 0 695 557;

copolymers of styrene and maleic anhydride which are both superplasticizers and grinding agents as follows from patent FR 2 744 714.

At present, for the preparation of cements, the trend is to use products that are less expensive than clinker. However, clinker confers good strength at 28 days. There is a need, therefore, for an admixture capable of correcting the strength at 28 days of cements containing little or no clinker.

Moreover, with regard to mortars, slurries and concretes, industry is seeking plasticizers and water-reducing agents or superplasticizers which are ecologically acceptable and which at the same time confer very good plasticity with little retardation, an early strength i.e. at between 8 and 24 hours, sufficient to allow rapid dismantling of the formwork, and improved strength at 28 days, if possible.

There is a need, therefore, for an ecologically acceptable admixture which makes it possible to obtain a good compromise between retardation, plasticity, early mechanical strength and mechanical strength at 28 days.

Within the scope of the present invention, the term plasticity of the mineral binder means the ability to obtain a Theological state in which the mineral binder is workable, pourable or pumpable.

The plasticity is measured according to the standardized method CEN 196-01 by which the spreading of a given volume of mineral binder over a vibrating table is measured in mm.

The initial set and final set are measured on a mineral binder by means of an automatic setometer with the brand name "ACMEL".

Within the scope of the invention, the early mechanical strength is measured on a specimen of mineral binder according to the standard CEN 196-01 mentioned above, 17 or 24 hours after the production of said specimen.

For applications in the building sector, this early mechanical strength must generally be more than 5 MPa to allow dismantling of formwork.

Moreover, the strength at 28 days of mineral binders is also measured according to the above-mentioned standard CEN 196-01.

After numerous searches, the Applicants discovered, to their merit, that of all the polyols, only the compositions containing at least 40% by weight of hydrogenated disaccharide made it possible to obtain a good compromise between retardation, plasticity, early mechanical strength and mechanical strength at 28 days. In particular, the Applicants observed, surprisingly and unexpectedly, that the higher the molecular weight of the polyols, the greater their retarding properties, and the lower their molecular weight the greater their tendency to give rise to false sets.

OBJECTS AND SUMMARY OF THE INVENTION

The present invention relates, therefore, to an admixture for mineral binders comprising a polyol composition containing at least 40% by weight, preferably at least 55% by weight and even more preferably at least 65% by weight of hydrogenated disaccharide, this percentage being expressed with respect to the dry weight of all the polyols contained in said composition.

The term "hydrogenated disaccharide" within the meaning of the present invention means, in particular, a product chosen from the group comprising maltitol, lactitol, glucosido-1,6 mannitol, isomaltitol, cellobiitol, and any mixtures of at least any two of these products such as, for example, palatinitol.

Preferably, the hydrogenated disaccharide is chosen from maltitol, lactitol and any mixtures thereof. Particularly advantageously, the hydrogenated disaccharide is composed of maltitol.

The polyols other than hydrogenated disaccharides that may be contained in said polyol composition may be of very different types and concentrations. They may be products such as sorbitol, mannitol, xylitol, arabitol, iditol, maltotriitol, erythritol, glycerol, hydrogenated oligo- and polysaccharides.

Consequently, the polyol composition which is useful as an admixture for hydraulic binders according to the invention may be composed of, for example:

pure maltitol, or pure lactitol, or any mixture of maltitol/lactitol, or a maltitol syrup or a hydrogenated starch hydrolysate of which the maltitol concentration is at least equal to 40%, or a mixture based on maltitol and/or lactitol on the one hand and glycerol on the other hand, the hydrogenated disaccharide(s) concentration of said mixture being at least 40%, a maltitol syrup containing borate such as BOROSORB® 553 sold by the Applicants.

Said polyol composition may be in the liquid, pasty or solid form, including powders. Any hydrogenated disaccharide that it contains may be crystalline or non-crystalline.

The admixture according to the invention may be entirely composed of the polyol composition as described. It may also comprise, apart from said polyol composition, at least one conventional admixture for mineral binder chosen, for example, from phosphates, sulfates, borates, amines (particularly triethanolamine), calcium salts (particularly calcium chlorides, hydroxides and formates), sulfonated melamine derivatives, sulfonated naphthalene derivatives, polyacrylates, glycols and/or lignosulfonates or mixtures thereof.

The conventional admixtures such as borates, sulfates or phosphates may be introduced in the admixture according to the invention in a quantity of 0.1% to 20%, this percentage being expressed in dry weight with respect to the dry weight of the polyol composition contained in said admixture.

In particular, the Applicants found, surprisingly, that the combination of such a polyol composition, notably maltitol, with certain conventional plasticizers or superplasticizers such as, in particular, lignosulfonates with or without sugar, made it possible to obtain synergistic effects, particularly in terms of mechanical strength of the mineral binders, both in terms of the early strength and the strength at 28 days.

Consequently, the admixture for mineral binders according to the invention may be characterized by the fact that it comprises, apart from a polyol composition as defined above, lignosulfonates with or without sugar, the weight ratio between the lignosulfonates and the polyol composition, expressed in dry weight of lignosulfonates with respect to the dry weight of the polyol composition, being in the range 1/20 to 20/1, preferably in the range 1/9 to 9/1 and even more preferably in the range 1/9 to 1/3.

The admixture according to the invention may itself be in the liquid, pasty or solid form, including powders. It is entirely suitable for use as an admixture for cement before, during and/or after grinding of said cement, as described for example in patent FR 2 744 714 mentioned above, or as an admixture for hydraulic limes. It is also perfectly suitable for use as an admixture for concretes, slurries and mortars whether liquid or solid.

The level of introduction of the admixture according to the invention will depend, inter alia, on the nature, the intended use and the conditions of use of the mineral binder.

In practice, this level will be in the range 0.001% to 5% expressed in dry weight of admixture with respect to the total dry weight of raw material(s) for cement, cement, and/or chalk contained in the hydraulic binder.

The invention also relates to a mineral binder:

chosen from ground or unground cements, raw materials for the production of cements before grinding, hydraulic limes and mixtures thereof, and that contains 0.001% to 1.5% by weight, preferably 0.005% to 0.5% by weight and even more preferably 0.01% to 0.3% by weight of an admixture as claimed, this percentage being expressed in dry/dry as described above.

According to another variant, the invention relates to a mineral binder:

chosen from mortars, slurries and concretes in liquid, pasty or solid form, and that contains 0.005% to 5% by weight, preferably 0.01% to 2% by weight and even more preferably 0.02% to 1% by weight of an admixture as claimed, this percentage being expressed in dry/dry as described above.

In a general manner, the admixture according to the invention may be introduced into the mineral binders in a great number of ways. In particular, it may be introduced entirely during a particular stage of production, storage, admixing, hydration, transport or placing of the mineral binder. It may also be introduced in a partial manner during several of these particular stages.

It may, for example, be used wholly or partly during the production of mineral binders in powder form, including production in the cement works themselves before, during and/or after grinding of the cement, or during the preparation of dry and/or ready-mixed mortars or concretes. It may also be used wholly or partly during the transport of non-powder i.e. pasty or liquid mineral binders, or during their production in the works or on site, and for example, in the water and/or aggregates required for the preparation, particularly in vessels known commonly as "ready-mix plants", of mortars, slurries or concretes, or just before the pouring thereof.

The present invention also relates, therefore to a process for the preparation of a mineral binder, in which an admixture as claimed is added in one or more operations to a mineral binder in powder form chosen from the group comprising ground or non-ground cements, raw materials for the production of cements before grinding, hydraulic limes, dry and/or ready-mixed mortars and concretes and mixtures thereof.

According to another variant, the present invention relates to a process for the preparation of mineral binder, in which an admixture as claimed is added in one or more operations a) to a non-powder, particularly pasty or liquid mineral binder chosen from the group comprising mortars, slurries and concretes and/or b) to the water and/or aggregates required for the preparation of said non-powder mineral binder.

Consequently, a general, novel and inventive means is henceforth available for admixing with mineral binders of all kinds, said means being composed of selected polyol compositions, as described above.

The general concept of the present invention is also based on the use of a hydrogenated disaccharide, particularly maltitol, for admixing with mineral binders, particularly with a view to improving the plasticity and/or mechanical properties thereof.

MORE DETAILED DESCRIPTION

The present invention will be described in more detail with the aid of the examples that follow and which are in no way limiting on the invention.

In all the examples that follow, the spreading measurements (in mm) and mechanical strength measurements (in MPa) at 17 hours, 24 hours or 28 days were carried out according to the standard CEN 196-01.

EXAMPLE 1

Reference mortars T1a and T1b were prepared by mixing 450 g of cement CPA 52.5 HP LAFARGE Cormeilles en Parisis, said cement originating respectively either from a first batch ("batch a") or a second batch ("batch b"), with 1350 g of standardized sand and 225 g of water.

Similarly, a reference mortar T2 was prepared by mixing 450 g of a batch of cement 55 HTS LAFARGE Le Teil with the same quantities of standardized sand and water as those specified above.

The spreading S in mm, the initial set IS and the final set FS were measured in hours and minutes, and the mechanical strengths at 24 hours, optionally at 17 hours and 28 days, in MPa.

The results obtained with the various batches of cement were as follows:

| REFERENCE MORTAR | T1a | T1b | T2 |
|---|---|---|---|
| SPREADING | 205.5 | 213 | 242 |
| INITIAL SET | 3h15 | 3h15 | 4h15 |
| FINAL SET | 4h30 | 4h30 | 5h30 |
| STRENGTH AT 17 h | 11.8 | — | 10.8 |
| STRENGTH AT 24 h | 15.5 | 15.2 | 15.8 |
| STRENGTH AT 28 d | 48.4 | — | 47.7 |

EXAMPLE 2

Within the scope of this example, the characteristics of hydraulic binders were evaluated, namely mortars containing admixtures of maltitol compositions which can be used according to the invention or, conversely, polyol compositions not in accordance with the invention.

The reference mortar was the mortar T1a as described in terms of its composition and characteristics in EXAMPLE 1.

The mortars containing admixture according or not according to the invention, were prepared in the same way as mortar T1a except that, in addition, 0.5% by weight, expressed in dry weight of admixture with respect to the dry weight of cement contained in the mortar, of each of the admixtures below were used:

- approximately 100% pure sorbitol in powder form, sold by the Applicants under the brand name NEOSORB® P60, or
- a hydrogenated glucose syrup sold by the Applicants under the brand name POLYSORB® 70/12/12 and containing approximately 15% by weight of maltitol, expressed with respect to the dry weight of said syrup, or
- approximately 100% pure xylitol in powder form, sold by the Applicants under the brand name XYLISORB® P90, or
- approximately 100% pure maltitol, crystalline, sold by the Applicants under the brand name MALTISORB® P200, or
- a maltitol syrup sold by the Applicants under the brand name MALTISORB® 75/75 and containing approximately 75% by weight of maltitol, expressed with respect to the dry weight of said syrup, or
- a maltitol syrup, sold by the Applicants under the brand name LYCASIN® 80/55 and containing approximately 52% by weight of maltitol, expressed with respect to the dry weight of said syrup.

For each of these mortars containing admixture, the spreading (S), the initial set (IS), the final set (FS) and the strength at 24 hours (S24 h) were measured. The results obtained are given below in comparison with those obtained with the reference mortar T1a not containing admixture.

| ADMIXTURE | S (mm) | IS (h + mn) | FS (h + mn) | S24h (MPa) |
|---|---|---|---|---|
| WITHOUT (reference) | 205.5 | 3h15 | 4h30 | 15.5 |
| NEOSORB ® P60 | 254 | 7h00 | 9h00 | 4.85 |
| POLYSORB ® 70/12/12 | 273 | 12h00 | 15h00 | 2.00 |
| XYLISORB ® P90 | 200 | 5h10 | 6h25 | 4.90 |
| MALTISORB ® P200 | 253 | 8h15 | 12h00 | 7.85 |
| MALTISORB ® 75/75 | 262 | 7h15 | 12h00 | 6.15 |
| LYCASIN ® 80/55 | 269 | 9h10 | 12h55 | 5.30 |

On the basis of these results, it will be observed that the polyol compositions containing at least 40% by weight of maltitol (expressed with respect to the dry weight of all the polyols of the composition) such as the products MALTISORB® P200, MALTISORB® 75/75 and LYCASIN® 80/55, made it possible, unlike the other polyol compositions tested, to obtain good early strength (namely greater than 5 MPa which allows dismantling of the formwork at 24 hours) whilst conferring very good spreading values on the hydraulic binders.

Regarding the admixtures not according to the present invention, it was observed in particular that 1) sorbitol gave rise to "false set" phenomena, 2) xylitol had no plasticizing effect and 3) the hydrogenated glucose syrup POLYSORB® 70/12/12 with a maltitol concentration of less than 40% gave a much too high retardation value which did not allow any early dismantling of the formwork of the hydraulic binder.

EXAMPLE 3

Within the context of this example, the reference was the mortar T1b as described in terms of its composition and characteristics in EXAMPLE 1.

The mortars containing admixture according or not according to the invention were prepared in the same way as mortar T1b except that, in addition, 0.3% by weight of each of the admixtures below was introduced:
  maltitol powder MALTISORB® P200, or
  lactitol monohydrate, or
  glycerol, or
  mannitol F sold by the Applicants.

For each of these mortars containing admixture, the spreading (S), the initial set (IS) and the final set (FS) were measured. The results obtained are given below in comparison with those obtained with the reference mortar T1b not containing admixture.

| ADMIXTURE | S (mm) | IS (h + mn) | FS (h + mn) |
|---|---|---|---|
| WITHOUT (reference) | 213 | 3h15 | 4h30 |
| MALTISORB ® P200 | 245 | 7h00 | 8h30 |
| Lactitol monohydrate | 251 | 8h45 | 10h30 |
| Glycerol | 210 | 2h40 | 4h25 |
| Mannitol F | 181 | 3h00 | 5h15 |

These results confirm the advantage of hydrogenated disaccharides such as maltitol and lactitol as admixtures for mineral binders. They made it possible to obtain very significantly increased spreading compared with the reference not containing admixture. In the present case and despite the retardation it brought about, maltitol also made it possible to obtain a particularly high strength at 24 hours, namely 13.80 MPa.

Lactitol appeared here to have a greater retarding effect than maltitol. Nevertheless, it made it possible to obtain a strength at 24 hours which fully complied with practical requirements, namely 11 MPa.

EXAMPLE 4

Within the scope of this example, the reference was mortar T1b as described in EXAMPLE 1.

Mortars containing admixture according to the invention were prepared in the same way as mortar T1b except that, in addition, 0.4% by weight of each of the admixtures below according to the invention was introduced:
  a mixture of maltitol powder MALTISORB® P200 and triethanolamine, the weight ratio of maltitol/triethanolamine being 9/1;
  a mixture of MALTISORB® P200 and borax in the same weight ratio of 9/1, and
  a mixture of MALTISORB® P200 and sodium tripolyphosphate in the same weight ratio of 9/1.

The results obtained are given below in comparison with those obtained with the reference mortar T1b not containing admixture.

| ADMIXTURE | S (mm) | IS (h + mn) | FS (h + mn) |
|---|---|---|---|
| WITHOUT (reference) | 213 | 3h15 | 4h30 |
| Mixture of MALTISORB ® P200 and triethanolamine (9/1) | 244 | 6h45 | 8h30 |
| Mixture of MALTISORB ® P200 and borax (9/1) | 246 | 9h45 | 11h15 |
| Mixture of MALTISORB ® P200 and tripolyphosphate (9/1) | 238 | 7h00 | 9h30 |

These results showed that the admixture for mineral binders according to the invention may well contain, apart from a polyol composition as described, at least one conventional admixture such as triethanolamine, borates or phosphates.

Such combinations of hydrogenated disaccharide/conventional admixture made it possible to obtain very significantly increased spreading values compared with the reference not containing admixture.

Other studies showed moreover that such combinations made it possible to obtain strengths at 24 hours which were generally greater than 10 MPa. This is the case in particular with the combination of maltitol/triethanolamine described above, which made it possible to obtain the remarkable value of 17 MPa at 24 hours.

EXAMPLE 5

Within the scope of this example, the reference was the mortar T2 as described in EXAMPLE 1.

The mortars containing admixture according or not according to the invention were prepared in the same way as mortar T2 except that the following were introduced, respectively:
  maltitol MALTISORB® P200 in a quantity of 0.06% or 0.08% by weight, or
  lactitol monohydrate in a quantity of 0.06% by weight, or
  sodium gluconate in a quantity of 0.06% or 0.08% by weight.

For each of these mortars containing admixture, the spreading and the mechanical strength at 17 hours (S17 h) were measured. The results obtained are given below in comparison with those obtained with the reference mortar T2 not containing admixture.

| ADMIXTURE | S (mm) | S17h (MPa) |
|---|---|---|
| WITHOUT (reference) | 242 | 10.8 |
| MALTISORB ® P200 (0.06%) | 270 | 8.6 |
| MALTISORB ® P200 (0.08%) | 275 | 6 |
| Lactitol (0.06%) | 265 | 7.6 |
| Na gluconate (0.06%) | 268 | 3.1 |
| Na gluconate (0.08%) | 271 | 0 |

These results confirmed the highly plasticizing role of hydrogenated disaccharides which made it possible, even at low levels of introduction (0.06%/cement for example), to increase very significantly the spreading values of the hydraulic binder studied.

It will be noted in particular that in the present case maltitol made it possible, in such levels of introduction, to obtain simultaneously a spreading of at least 270 mm and a strength at 17 hours of more than 8 MPa.

With a conventional admixture such as sodium gluconate, a spreading admittedly around 270 mm is obtained under the same conditions, but the strength values obtained at 17 hours, largely below 5 MPa, are incompatible with practical requirements.

EXAMPLE 6

Within the scope of this example, the reference was the mortar T1a as described in EXAMPLE 1.

Mortars according or not according to the invention were prepared in the same way as mortar T1a except that the following were introduced, respectively:

0.3% by weight of raw lignosulfonates, or 0.3% by weight of maltitol MALTISORB® P200, or 0.3% by weight of a mixture of MALTISORB® P200 and raw lignosulfonates, the weight ratio of maltitol/lignosulfonates being 9/1.

For each of these mortars containing admixtures, the spreading, mechanical strength at 17 hours and mechanical strength at 28 days (S28 d) were measured. The results obtained are given below in comparison with those obtained with the reference mortar T1a not containing admixture.

| ADMIXTURE | S (mm) | S17h (MPa) | S28d (MPa) |
|---|---|---|---|
| WITHOUT (reference) | 205.5 | 11.8 | 48.4 |
| 0.3% lignosulfonates | 223 | 6.1 | 28.7 |
| 0.3% MALTISORB ® P200 | 211 | 8.2 | 52.3 |
| 0.3% mixture 9/1 MALTISORB ® 200/lignosulfonates | 237 | 8.4 | 58.5 |

These results showed the existence of synergistic effects between the hydrogenated disaccharide, namely maltitol, and a conventional admixture such as lignosulfonates. These effects were all the more remarkable and surprising in that they were exerted favorably and significantly, not only for the ratio of 9/1 described above but also for ratios from 1/20 to 20/1, both on the plasticity and on the strength of the mineral binder.

EXAMPLE 7

Within the scope of this example, the effect studied was that of incorporating a polyol composition which can be used according to the invention in a non-hydrated cement, raised to and kept at a high temperature.

More specifically, the cement CPA 52.5 HP LAFARGE was heated for 2 hours at about 100° C. then 0.1% by weight (dry/dry) of a maltitol syrup containing 70% dry solids (DS) containing 45% by weight of maltitol, expressed with respect to the DS, was incorporated therein by mixing in a device of the ROBOT-COUPE type. The cement containing admixture thus obtained was then kept for one hour at about 100° C.

After cooling, a mortar was prepared from this cement containing admixture according to the procedure of EXAMPLE 1.

According to the same procedure, a reference mortar was prepared from a cement CPA 52.5 HP not containing admixture and kept for 3 hours at 100° C.

The spreading values obtained after production of the mortars and the strength values at 17 hours were comparable (S of the order of 220 mm; S17 h about 11 MPa). However, the strength at 28 days obtained with the cement containing maltitol admixture was found to be of the order of 52 MPa whereas that obtained with the cement not containing admixture is about 47 MPa, that is, an increase in strength of about 10%.

This example showed that a polyol composition composed of maltitol may also be used advantageously as an admixture even in a cement.

The same observation was made when maltitol was replaced by lactitol. In this case, however, a difference was noted in comparison with maltitol in that, in identical dosages, lactitol gave a slightly lower strength at 17 hours due to retardation.

We claim:

1. A process for the preparation of a mineral binder, wherein an admixture comprising a polyol composition containing at least 40% by weight of hydrogenated disaccharide, said percentage being expressed with respect to the dry weight of all the polyols contained in said composition, is added in one or more operations to a mineral binder in powder form selected from the group consisting of cements, raw materials for the production of cements, hydraulic limes, dry or ready-mixed mortars and cement or mixtures thereof, said admixture being added in a ratio of 0.0001 to 5%, this percentage being expressed in dry admixture with respect to the total dry weight of said raw materials.

2. A process according to claim 1, wherein the admixture comprises a polyol composition containing at least 55% by weight of hydrogenated disaccharide, this percentage being expressed with respect to the dry weight of all the polyols contained in said composition.

3. A process according to claim 2, wherein the admixture comprises a polyol composition containing at least 65% by weight of hydrogenated disaccharide, this percentage being expressed with respect to the dry weight of all the polyols contained in said composition.

4. A process according to claim 1, wherein said hydrogenated disaccharide is selected from the group consisting of maltitol, lactitol and any mixtures of said two products.

5. A process according to claim 4, wherein said hydrogenated disaccharide consists of maltitol.

6. A process according to claim 1, wherein the admixture also comprises at least one product selected from the group consisting of phosphates, sulfates, borates, amines, calcium salt, sulfonatedmelamine derivatives, sulfonated naphthalene derivatives, polyacrylates, glycols, lignosulfonates and any mixtures of at least any two of said products.

7. A process according to claim 1, wherein the admixture also comprises lignosulfonates with or without sugar, the weight ratio between said lignosulfonates and said polyol composition, expressed in dry weight of said polyol composition, being in range 1/20 to 20/1.

8. A process according to claim 7, wherein said weight ratio between said lignosulfonates and said polyol composition is in the range to 1/9 to 9/1.

9. A process according to claim 8, wherein said weight ratio between said lignosulfonates and said polyol composition is in the range to 1/9 to 1/3.

10. A process according to claim 1, wherein the ratio is 0.0001 to 1.5%.

11. A process according to claim 10, wherein the ratio is 0.005 to 0.5%.

12. A process according to claim 11, wherein the ratio if 0.01 to 0.3%.

13. A process for the preparation of a mineral binder, wherein an admixture comprising a polyol composition containing at least 40% by weight of hydrogenated disaccharide, this percentage expressed with respect to the dry weight of all the polyols contained in said composition, is added in one or more operations
   a) to a mineral binder not in powder form, particularly in paste or liquid form, selected from the group consisting of mortars, cement slurries or grouts and concretes, or,
   b) to the water or aggregates required for the preparation of said mineral binder not in powder form,
the admixture being added in a ratio of 0.005 to 5%.

14. A process according to claim 13, wherein the admixture comprises a polyol composition containing at least 55% by weight of hydrogenated disaccharide, this percentage being expressed with respect to the dry weight of all polyol contained in said composition.

15. A process according to claim 14, wherein the admixture comprises a polyol composition containing at least 65% by weight of hydrogenated disaccharide, this percentage being expressed with respect to the dry weight of all polyols contained in said composition.

16. A process according to claim 13, wherein said hydrogenated disaccharide is selected from the group consisting of maltitol, lactitol and any mixtures of said two products.

17. A process according to claim 13, wherein said hydrogenated disaccharide consists of maltitol.

18. A process according to claim 13, wherein the admixture also comprises at least one product selected from the group consisting of phosphates, sulfates, borates, amines, calcium salts, sulfonated melamine derivatives, sulfonated naphthalene derivatives, polyacrylates, glycols, lignosulfonates and any mixtures of at least any two of said products.

19. A process according to claim 13, wherein the admixture also comprises lignosulfonates with or without sugar, the weight ratio between said lignosulfonates and said polyol composition, expressed in dry weight of said polyol composition, being in the range 1/20 to 20/1.

20. A process according to claim 19, wherein said weight ratio between said lignosulfonates and said polyol composition is in the range to 1/9 to 9/1.

21. A process according to claim 20, wherein said weight ratio between said lignosulfonates and said polyol composition is in the range to 1/9 to 1/3.

22. A process according to claim 13, wherein the admixture is added in a ratio of 0.01 to 2%.

23. A process according to claim 22, wherein said ratio is 0.02 to 1%.

* * * * *

UNITED STATES PATENT AND TRADEMARK OFFICE
CERTIFICATE OF CORRECTION

PATENT NO. : 6,648,964 B2
DATED : November 18, 2003
INVENTOR(S) : Leon Mentink, Jean-Pierre Graux and Robert Clement It is certified that error appears in the above-identified patent and that said Letters Patent is hereby corrected as shown below:

<u>Title page,</u>
After Item [62], please insert the following:
-- Foreign Application Priority Data
Feb. 11, 1998   (FR)…………………..98 01642 --.

Signed and Sealed this

Twenty-third Day of March, 2004

JON W. DUDAS
*Acting Director of the United States Patent and Trademark Office*